Figure 1:
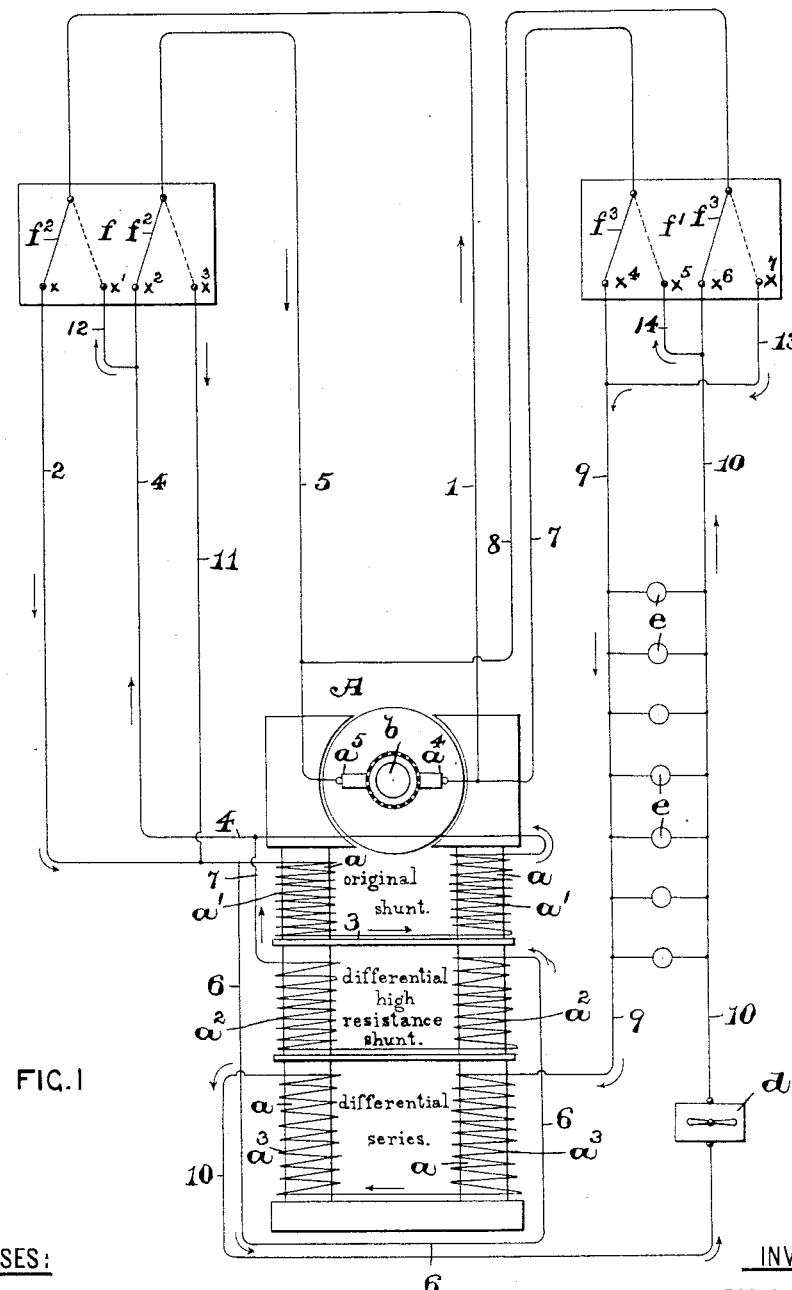

(No Model.) 3 Sheets—Sheet 2.

M. MOSKOWITZ.
ELECTRIC LIGHTING SYSTEM AND DYNAMO THEREFOR.

No. 542,487. Patented July 9, 1895.

WITNESSES:
Wm. H. Canfield Jr.
A. Basil Hooper

INVENTOR:
MORRIS MOSKOWITZ.
BY Fred C. Fraentzel,
ATTORNEY (No Model.) 3 Sheets—Sheet 3.

M. MOSKOWITZ.
ELECTRIC LIGHTING SYSTEM AND DYNAMO THEREFOR.

No. 542,487. Patented July 9, 1895.

WITNESSES:
Wm. H. Canfield, Jr.
Walter G. E. Ward

INVENTOR:
MORRIS MOSKOWITZ.
BY Fred F. C. Fraentzel ATT'Y.

UNITED STATES PATENT OFFICE.

MORRIS MOSKOWITZ, OF NEWARK, NEW JERSEY, ASSIGNOR TO THE NATIONAL ELECTRIC CAR LIGHTING COMPANY, OF WEST VIRGINIA.

ELECTRIC-LIGHTING SYSTEM AND DYNAMO THEREFOR.

SPECIFICATION forming part of Letters Patent No. 542,487, dated July 9, 1895.

Application filed May 11, 1895. Serial No. 548,901. (No model.)

*To all whom it may concern:*

Be it known that I, MORRIS MOSKOWITZ, a citizen of the United States, residing at Newark, in the county of Essex and State of New Jersey, have invented certain new and useful Improvements in Electric-Lighting Systems and Dynamos Therefor Subject to Variable Armature Speed; and I do hereby declare the following to be a full, clear, and exact description of the invention, such as will enable others skilled in the art to which it appertains to make and use the same, reference being had to the accompanying drawings, and to letters and numerals of reference marked thereon, which form a part of this specification.

My present invention has reference to that class of electrical apparatus in which the electric energy for operating the lamps or other translating devices is obtained from a dynamo-electric machine driven by a variable-speed power, and the invention is applicable to a dynamo driven from a rotating car-wheel axle, or any other class of dynamo operated by a variable-speed power, or to electromagnetic motors in which the resistance is varied directly or indirectly by the motor.

My invention is designed more especially for use with dynamos operated by the variable speed obtained from the car-wheel axle of a railway-car, with which the dynamo is connected in any suitable manner; but my invention is also designed for use in the stationary plants in connection with dynamos or motors subject to variable speed.

The object of this invention, therefore, is to provide a self-contained, self-regulating dynamo-electric or other like machine which is not dependent upon a battery or other constant source of supply for exciting the fields of the machine to maintain a uniform electromotive force irrespective of the speed of the armature rotation, my invention resulting in a machine which is entirely self-exciting.

It is a well-known fact that a common shunt-wound machine when self-excited will with an increase of the armature speed, after a predetermined speed of rotation, develop an abnormal amount of energy, not merely because the increase of speed develops more current in the armature, but because the constantly-rising voltage is being forced through the shunt-winding and thereby constantly produces increasing strength in the magnetic field of the dynamo. This is one reason why in previous inventions pertaining to dynamos operated by varying-speed power a constant source of current, as from a secondary or storage battery, has been employed for the field excitation. In an arrangement of this kind all that one has to contend with is the extra amount of energy developed in the armature on account of a higher or increased speed, the field of the dynamo or other like machine being constant. If, however, this field is not constant, but is receiving an extra supply of current in the same proportion of current over and above the proper amount, then the oppositely-wound field-coil used in these constructions could not and would not cut down the current sufficiently to make up for such extra supply, and therefore the machine is not a self-regulating dynamo; and, further, even when the supply of current through said oppositely-wound field is constant, as from a battery, there will be a time when the series coil can no longer maintain the field constant to produce a constant voltage. Hence, the range of such machines in which the field-exciting coil is fed from a battery which the field-coil in the main circuit with the armature of the dynamo is to oppose is necessarily very limited. For ordinary purposes this arrangement might answer; but in order to render a dynamo subject to varying-speed power, as in train-lighting, practical and successful a large range, as from one hundred and fifty to one thousand revolutions of the dynamo, is necessary— that is to say, that at one hundred and fifty revolutions of the dynamo it develops its normal output of electromotive force, and this must be maintained throughout the range of varying armature speed from said one hundred and fifty to one thousand revolutions. I have accomplished this by my present invention, the principle and operation of which will be hereinfter fully described, and finally embodied in the clauses of the claim.

The invention is illustrated in the accompanying sheets of the drawings, in which—

Figure 2:
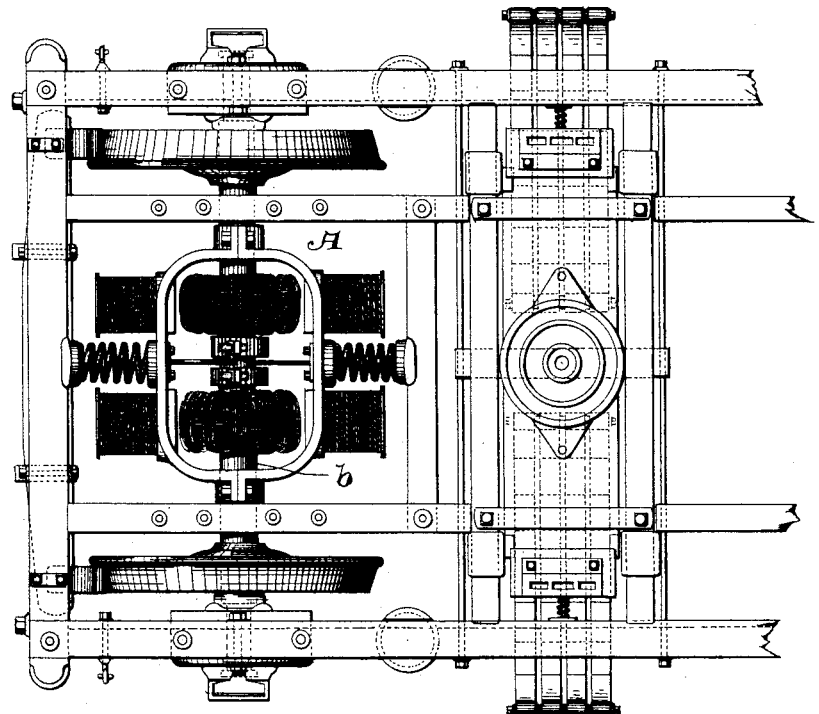
Figure 3:
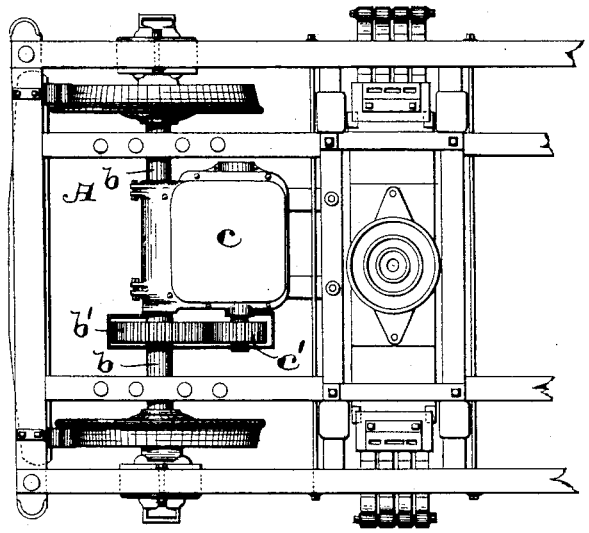
Figure 4:
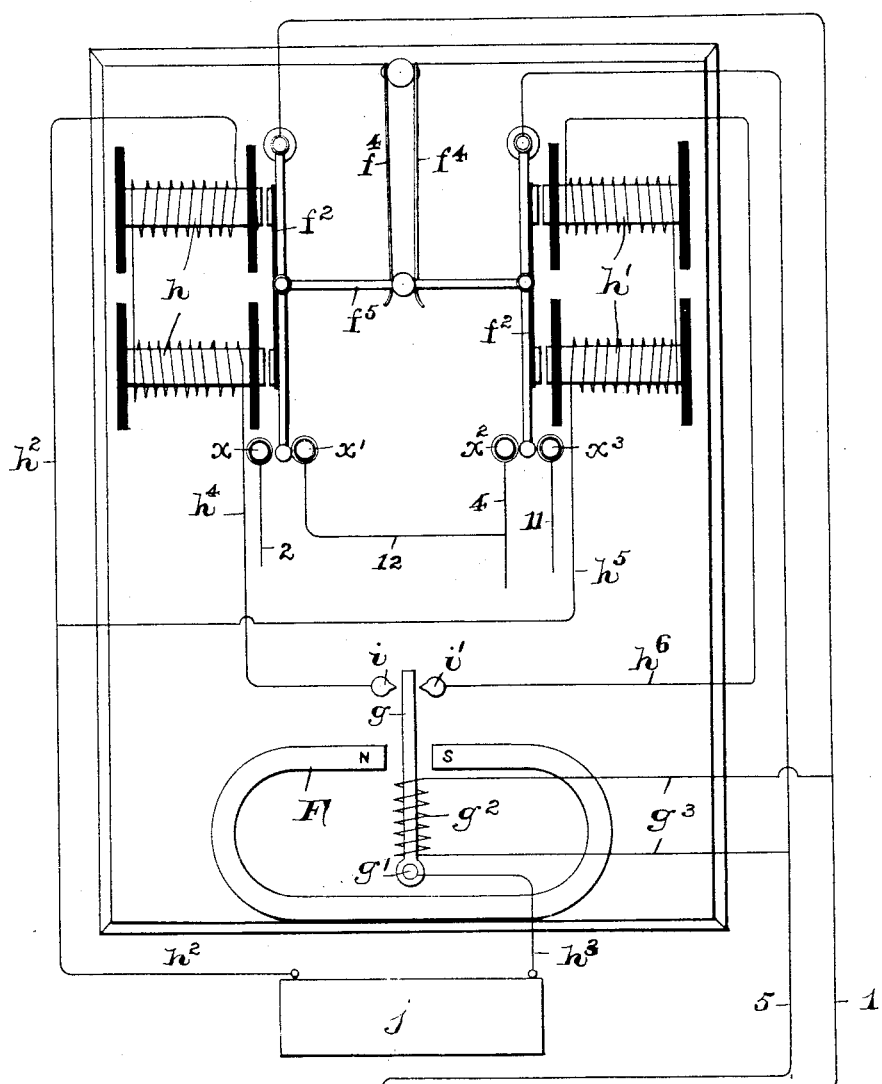

Figure 1 is a diagrammatic view of my invention, illustrating an arrangement of dynamo subject to varying armature speed and the circuits connected therewith to produce a self-regulating dynamo. Figs. 2 and 3 are plan views of portions of car-trucks and a car-wheel axle, illustrating different arrangements of the dynamos on the trucks. Fig 4 is a view of one of the pole-changers and certain circuits for operatively connecting the same with the dynamo to render it responsive to the reversal of rotation of the dynamo-armature.

Similar letters and numerals of reference are employed in each of the above-described views to indicate like parts.

In said views, A indicates the dynamo, which is arranged in connection with the car-wheel axle $b$ in any well-known manner, as will be clearly understood from an inspection of said Figs. 2 and 3. Said dynamo may be directly arranged on the car-wheel axle, as in Fig. 2, the same being of the type and construction illustrated in my former patent, No. 531,421, granted December 25, 1894, or the dynamo may be arranged in a suitable casing $c$, which is pivotally connected with the car-wheel axle, the armature-shaft of the dynamo having a gear-wheel $c'$ thereon, which meshes with a gear-wheel $b'$ on the car-wheel axle $b$, as is illustrated in Fig. 3. This form of dynamo is of the type and construction shown in my previous patent, No. 525,992, issued September 11, 1894; but it will be evident that any other well-known forms of dynamo or other like electrical machines may be employed in connection with my present invention. As will be seen from an inspection of Fig. 1, said dynamo A has its fields $a$ in a simple shunt-circuit 1 2 3 4 5, the same being self-excited in the usual manner and not dependent on any outside source, such as a battery, for a constant supply of electricity for exciting the fields.

On the fields $a\ a$ I have wound, in an opposite direction to the shunt-winding $a'$, a second shunt-winding $a^2$, which is connected with the circuit-wires 6 7 and makes contact with the wires 2 and 4 of the original shunt-circuit. Said second circuit, which is a differential high-resistance shunt, has little effect on the fields of the dynamo until such time when the voltage of the machine is high enough to force the current through this high-resistance shunt-winding, but in an opposite direction to the passage of the current through the original shunt-circuit. Thus it will be seen that the work of the two currents oppose each other, and the differential high-resistance shunt-current not only maintains a constant field of the dynamo, but at certain times reduces the strength of said field.

Extending from the circuit-wires 1 and 5, respectively, are the circuit-wires 7 8 9 10, which are wound in differential series coils $a^3$ around the fields $a$ of the dynamo, as will be clearly seen from said Fig. 1. In said circuit 9 10 is placed a suitable switch $d$ and lamps $e$ or any other suitable translating devices. As has been stated, the said main or external circuit is passed around the dynamo-fields in the well-known manner of a compound differentially-wound machine, and it will be seen that I have devised my novel form of self-contained self-excited dynamo, having all the benefits of a compound differentially-wound machine, at the same time being independent of the use of a battery or other source for a constant supply of electricity for the field excitation. Furthermore, I have also provided a means of producing a very great range of armature speed in dynamos of this class, especially those to be used in connection with a car-wheel axle for train-lighting, as the second shunt-circuit or the differential high-resistance shunt may be cut down in any proportion, and instead of merely keeping the dynamo-fields constant it will also assist the series coil in maintaining the voltage constant within such very wide range. By this arrangement of the original shunt, the differential high-resistance shunt, and the differential series windings on the field of the dynamo-electric machine it will be seen that a constant difference of potential will be maintained at the terminals of the dynamo-electric generator, irrespective of the speed of rotation of the armature, and such difference of potential will always be maintained constant, and that, too, during a very wide range of the armature speed.

The direction of the currents through the several circuits will be evident from an inspection of Fig. 1, the same passing from the terminal $a^4$ of the dynamo through the circuit-wires 1 2 and the shunt-coils $a'$, around the dynamo-fields $a$, through the circuit-wires 4 5, in the direction of the arrow, back to the other terminal $a^5$ of the dynamo for the original shunt-circuit, which self-excites the fields of the dynamo in the usual manner. By this means the field-coils $a'$ provide for the self-excitation; but the coils in the differential high-resistance shunt operate to cut down the field magnetism thus developed, (the current in said high-resistance shunt-circuit passing in an opposite direction from that in the original shunt-circuit, as indicated by the arrow,) when the armature speed rises and causes an increased current to flow through the original shunt-coils $a'$. The current generated from the dynamo also passes into the main or external circuit from the terminal $a^4$ into the circuit-wires 7 9, through the coils $a^3$, in the direction of the arrow, around the fields $a$, and then through the wires 10 8 and circuit-wire 5 back to the other terminal $a^5$ of the dynamo. In this manner, when a complete circuit is established through the switch $d$, a constant current will be passing through the lights or other translating devices in said circuit and through said main or external circuit as it passes around the dynamo-fields in the same direction as the current passing through the differential high-resistance coils, and will thereby help the latter to oppose the current passing in an opposite direction through the coils of the original shunt-circuit surrounding the same fields of the dynamo. A constant difference of potential at the terminals of the dynamo-electric machine is thereby maintained.

When my invention is to be used in connection with systems for lighting railway-cars by electricity derived from a dynamo driven from the car-wheel axle, which is subject to variation in armature speed and also to reversal of armature rotation, a suitable pole-changer $f$ is arranged in the circuit-wires 1 5 and 2 4, in order that when the armature rotation is reversed the current passing through the original shunt-circuit and through the differential high-resistance shunt-circuit will continue to pass through the field-coils $a'$ and $a^2$ without any change of direction, as indicated by the arrows in Fig. 1. It will also be necessary to arrange a pole-changer $f'$ of any suitable construction in the circuit-wires 7 8 9 10, in order that the direction of the current through the coils $a^3$ may remain the same, irrespective of the direction of the armature rotation of the dynamo. Thus it will be seen that when the armature rotation is reversed and the current comes from the terminal $a^5$ and passes through the wire 5 to the pole-changer $f$, the arms $f^2$ thereof, now making contact with the electrical contacts $x$ and $x^2$, will pass into the wire 11 and into and through the coil $a'$ in the direction of the arrow, out through the wire 4 and wire 12, through the pole-changer $f$, and thence by the other wire 1 to the other terminal $a^4$ of the dynamo. Hence it will be evident that although the direction of the current coming from the dynamo has been changed it still passes through the original shunt-circuit in the same direction, and in the same manner the direction of the current through the differential high-resistance shunt-coils will remain unchanged.

To prevent the change of direction of the current in the main or external circuit through the differential series coils $a^3$ a pole-changer $f'$ is arranged in the circuit 7 8 9 10, as has been previously stated, and when the arms $f^3$ thereof are respectively changed from the contacts $x^4$ and $x^6$ to the contacts $x^5$ and $x^7$, and the direction of armature rotation has been reversed, then the current coming from the terminal $a^5$ of the dynamo through the wire 8 will pass through wire 13 into wire 9 and through the coil $a^3$ without any change of direction, back through wires 10 and 14 and wire 7 to the other terminal $a^4$ of the dynamo without any change of direction of the flow of the current through the field-coils $a^3$, or through the lamps or other translating devices in said main or external circuit. Said pole-changers may be of any well-known form of construction and may act automatically, either by some mechanical or electrical means, or they may be operated by hand, as will be clearly evident. As has been stated, said pole-changers may respond automatically to the reversal of rotation of the dynamo-armature. One means of operating the pole-changer is illustrated in Fig. 4. In said drawings I have shown the pole-changer $f$ connected in circuit with the dynamo for automatically operating the contact-arms of the pole-changer. The two contact-arms $f^2$ are connected by a suitable cross-bar $f^5$, and $f^4$ are a pair of springs which normally hold said arms $f^2$ disengaged from contact with the contacts $x$ and $x^2$ or $x'$ and $x^3$. Two electromagnets $h$ and $h'$ are employed to attract said arms $f^2$ $f^2$ to either side, as the case may be, and F is a suitable permanent magnet. Pivoted at $g'$ is a soft-iron bar $g$ subject to being magnetized either to a north or south pole, according to the direction of the flow of current from the main dynamo A, through the coil $g^2$, encircling said bar $g$ and connected in shunt with the dynamo by the wires $g^3$ $g^3$. Owing to the change of polarity of the bar $g$, according to the direction of rotation of the dynamo-armature, said bar makes contact at either one of certain contact-pieces $i$ and $i'$, according to which end of the permanent magnet F attracts said bar.

The circuit through the electromagnets $h$ and $h'$ can be established for the magnet $h$ through wire $h^2$, battery $j$, wire $h^3$, bar $g$, contact $i$, and wire $h^4$ to the magnet $h$, or for the electromagnet $h'$ through wires $h^5$ and $h^2$, battery $j$, wire $h^3$, arm $g$, contact $i'$, and wire $h^6$ to the magnet $h'$, thereby establishing, automatically, a complete circuit through either of said electromagnets, according to the direction of rotation of the dynamo-armature, and operating the contact-arms $f^2$ $f^2$ accordingly, as will be evident. The other pole-changer $f'$ can be similarly connected in circuit with the main dynamo to cause it to be responsive to the reversal of power.

By the manner of winding the fields of the dynamo, as herein shown and described, it will be seen that I have devised a complete system for electric-lighting purposes and in which the dynamo will at all times deliver a constant electromotive force for variations of speed over and above a predetermined speed.

Having thus described my invention, what I claim is—

1. The combination, with a working or main circuit containing lamps or other translating devices, of a dynamo in said main circuit, and wound in a differential series coil around the field of said dynamo, said dynamo having a self-excited field coil in circuit with its armature, and an opposing high resistance field coil fed from the dynamo, substantially as and for the purposes set forth.

2. The combination, with a working or main circuit containing lamps or other translating devices, of a dynamo in said main circuit, and a reversible driving power for operating the same, said main circuit being wound in a differential series coil around the field of said dynamo, a pole changer in said main circuit, a self-excited field coil on said dynamo in circuit with its armature, an opposing high resistance field coil in circuit with and fed from said dynamo, and a pole changer in circuit with the dynamo armature and said field coils, substantially as and for the purposes set forth.

3. The combination, with a dynamo having its armature in circuit with a differential high resistance coil which tends to cut down the field magnetism, of a reversible driving power, and a pole changer responsive to the reversal of said power, and a main circuit connected with said dynamo and wound in a differential series coil around the field thereof, and co-acting with said differential high resistance coil, substantially as and for the purposes set forth.

4. The combination, with a dynamo having its armature in circuit with a differential high resistance coil which tends to cut down the field magnetism, of a reversible driving power, and a pole changer responsive to the reversal of said power, and a main circuit connected with said dynamo and wound in a differential series coil around the field thereof, and co-acting with said differential high resistance coil, and a pole changer in said main circuit, substantially as and for the purposes set forth.

5. The combination, of a dynamo mounted on a car truck and driven from the car-wheel axle, a field-exciting coil fed from said dynamo, an opposing differential high resistance field coil also fed from said dynamo, a pole changer in the connecting circuits, and a main circuit connected with said dynamo wound in a differential series coil around the field of said dynamo, and co-acting with said differential high resistance coil to cut down the field magnetism, substantially as and for the purposes set forth.

6. The combination, of a dynamo mounted on a car truck and driven from the car-wheel axle, a field-exciting coil fed from said dynamo, an opposing differential high resistance field coil also fed from said dynamo, a pole changer in the connecting circuits, and a main circuit connected with said dynamo wound in a differential series coil around the field of said dynamo, and co-acting with said differential high resistance coil to cut down the field magnetism, and a pole changer in said main circuit, substantially as and for the purposes set forth.

7. A dynamo-electric machine, subject to variable armature speed, having a self-excited field coil in shunt with its armature, an opposing differential high resistance field coil, also in shunt with the armature of said dynamo, and a differential series field coil, in main circuit with the armature of the dynamo, co-acting with said differential high resistance coil, to cut down the field magnetism of said dynamo, substantially as and for the purposes set forth.

In testimony that I claim the invention set forth above I have hereunto set my hand this 4th day of May, 1895.

MORRIS MOSKOWITZ.

Witnesses:
FREDK. C. FRAENTZEL,
LEON D. ADLER.